United States Patent
Barnes et al.

(10) Patent No.: US 6,427,909 B1
(45) Date of Patent: *Aug. 6, 2002

(54) SYSTEM AND METHOD FOR OVERLOADING AN EXISTING CARD

(75) Inventors: Stacey Alan Barnes, Round Rock; Viktors Berstis, Austin, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/465,289

(22) Filed: Dec. 17, 1999

(51) Int. Cl.$^7$ .................................................. G06K 5/00
(52) U.S. Cl. ....................... 235/380; 235/380; 235/381; 235/382; 235/382.5; 235/375; 705/41; 705/42
(58) Field of Search ................................. 235/379, 380, 235/381, 382, 375, 440, 492, 494, 487; 705/41, 35, 39, 42

(56) References Cited

U.S. PATENT DOCUMENTS

| | | | |
|---|---|---|---|
| 4,443,027 A | 4/1984 | McNeely et al. | 235/487 |
| 4,575,621 A | 3/1986 | Dreifus | |
| 4,593,936 A | 6/1986 | Opel | 283/112 |
| 4,614,861 A * | 9/1986 | Pavlov et al. | 235/380 |
| 4,700,055 A | 10/1987 | Kashkashian, Jr. | 235/379 |
| 4,717,815 A | 1/1988 | Tomer | |
| 4,766,293 A | 8/1988 | Boston | |
| 4,766,294 A | 8/1988 | Nara et al. | |
| 4,771,460 A | 9/1988 | Tamada et al. | |
| 4,797,542 A | 1/1989 | Hara | |
| 4,800,255 A | 1/1989 | Imran | |
| 4,806,745 A | 2/1989 | Oogita | |
| 4,812,634 A | 3/1989 | Ohta et al. | |
| 4,851,654 A | 7/1989 | Nitta | |
| 4,868,376 A | 9/1989 | Lessin et al. | |

(List continued on next page.)

FOREIGN PATENT DOCUMENTS

| | | |
|---|---|---|
| DE | 004138131 A1 | 4/1993 |
| JP | 404367090 A | 12/1992 |
| JP | 405210771 A | 8/1993 |

OTHER PUBLICATIONS

U.S. patent application Ser No. 09/465,292, Stacey Alan Barnes, et al., filed Dec. 17, 1999.
U.S. patent application Ser No. 09/465,290 Stacey Alan Barnes, et al., filed Dec. 17, 1999.
U.S. patent application Ser. No. 09/465,291, Stacey A. Barnes, et al., filed Dec. 17, 1999.
U.S. patent application Ser. No. 09/465,293, Stacey Barnes et al., filed Dec. 17, 1999.

Primary Examiner—Karl D. Frech
Assistant Examiner—Uchau Le
(74) Attorney, Agent, or Firm—Marilyn Smith Dawkins; Bracewell & Patterson, L.L.P.

(57) ABSTRACT

A system and method of providing and using an overloaded card with overloaded card services. A card terminal reads a host card, and a server system determines whether or not to overload the host card with a card service of one other card. The server system overloads the host card with the other card services by associating the other card services with the host card within the server system such that no additional information must be encoded within or maintained by the host card.

25 Claims, 7 Drawing Sheets

U.S. PATENT DOCUMENTS

| | | |
|---|---|---|
| 4,874,934 A | 10/1989 | Nakahara et al. |
| 4,876,441 A | 10/1989 | Hara et al. |
| 4,973,828 A | 11/1990 | Naruse et al. |
| 5,055,662 A | 10/1991 | Hasegawa |
| 5,072,103 A | 12/1991 | Nara |
| 5,223,699 A | 6/1993 | Flynn et al. |
| 5,239,583 A | 8/1993 | Parrillo |
| 5,276,311 A * | 1/1994 | Hennige ............... 235/380 |
| 5,324,922 A | 6/1994 | Roberts |
| 5,388,148 A | 2/1995 | Seiderman |
| 5,477,040 A | 12/1995 | Lalonde ............... 235/380 |
| 5,478,994 A | 12/1995 | Rahman et al. |
| 5,521,363 A | 5/1996 | Tannenbaum |
| 5,530,232 A * | 6/1996 | Taylor ............... 235/380 |
| 5,546,523 A | 8/1996 | Gatto ............... 235/379 |
| 5,550,897 A | 8/1996 | Seiderman |
| 5,559,313 A * | 9/1996 | Claus et al. ............ 235/380 |
| 5,578,808 A * | 11/1996 | Taylor ............... 235/380 |
| 5,590,038 A * | 12/1996 | Pitroda ............... 235/380 |
| 5,627,355 A | 5/1997 | Rahman et al. |
| 5,682,027 A * | 10/1997 | Bertina et al. ............ 235/380 |
| 5,714,744 A | 2/1998 | Brice |
| 5,731,575 A | 3/1998 | Zingher et al. |
| 5,801,367 A | 9/1998 | Asplund et al. |
| 5,850,599 A | 12/1998 | Seiderman |
| 5,859,419 A | 1/1999 | Wynn |
| 5,875,437 A | 2/1999 | Atkins |
| 5,884,271 A | 3/1999 | Pitroda |
| 5,936,221 A | 8/1999 | Corder et al. |
| 5,940,511 A | 8/1999 | Wilfong |
| 5,955,961 A | 9/1999 | Wallerstein |
| 6,032,136 A * | 2/2000 | Brake, Jr. et al. ............ 705/41 |
| 6,038,551 A | 3/2000 | Barlow et al. |
| 6,068,183 A | 5/2000 | Freeman et al. |
| 6,145,739 A | 11/2000 | Bertina et al. |
| 6,216,955 B1 | 4/2001 | Le Roux et al. |
| 6,229,810 B1 * | 5/2001 | Gerszberg et al. .......... 370/401 |

* cited by examiner

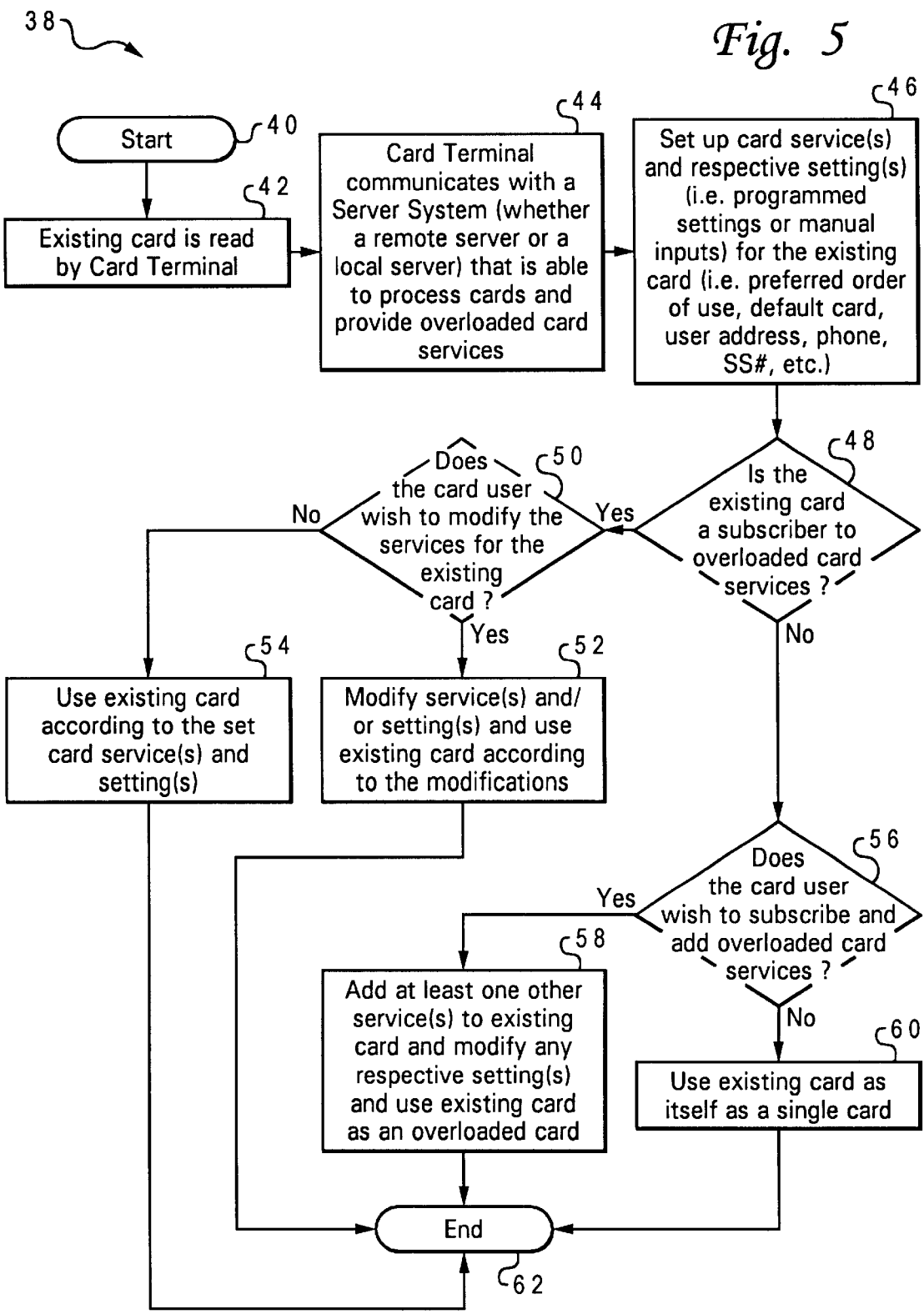

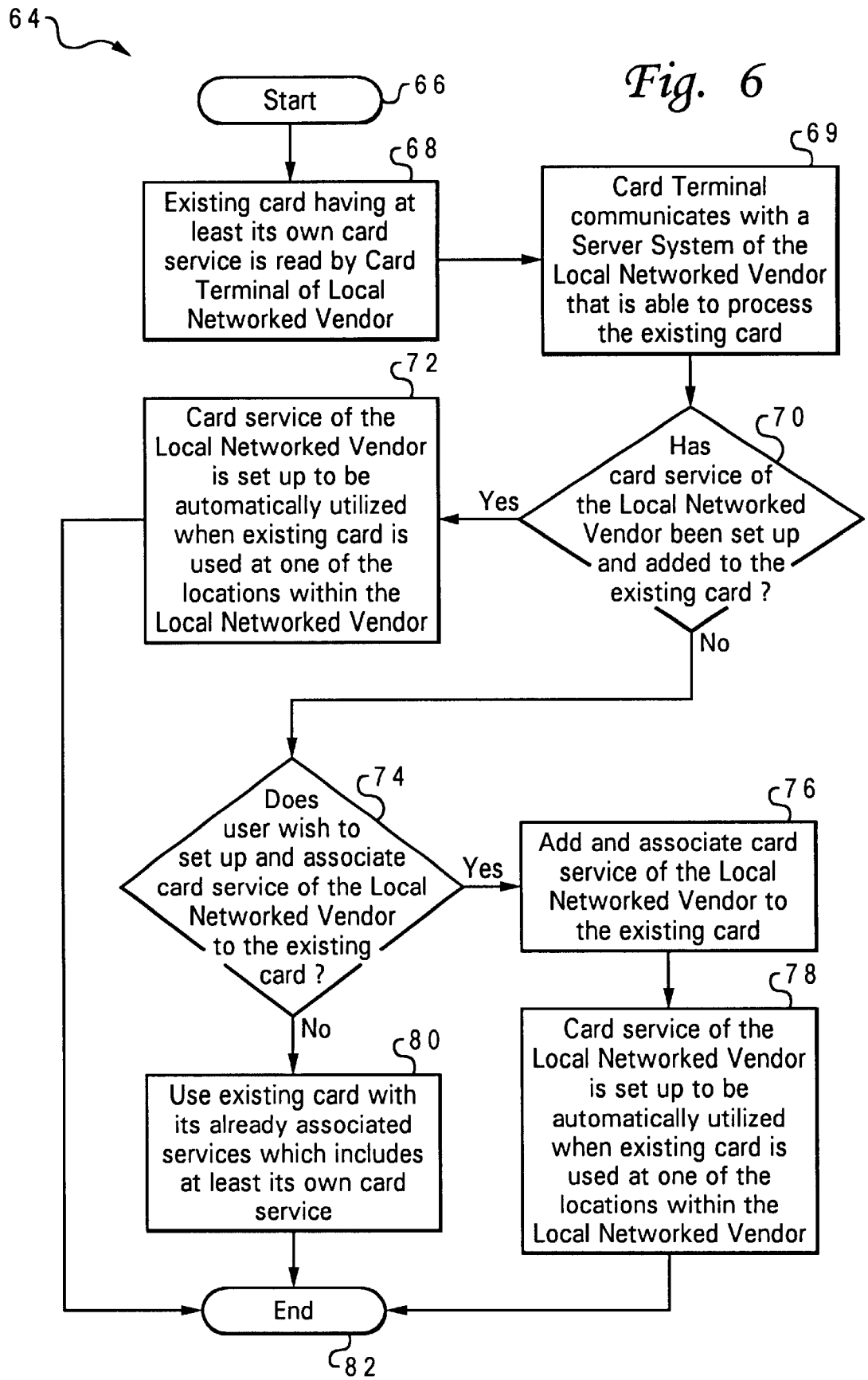

SYSTEM AND METHOD FOR OVERLOADING AN EXISTING CARD

RELATED APPLICATION

The present invention is related to the subject matter of commonly assigned, copending U.S. patent applications: Ser. No. 09/465,292; Ser. No. 09/465,290; Ser. No. 09/465,291; Ser. No. 09/465,293. The content of the above-identified applications is incorporated herein by reference.

BACKGROUND OF THE INVENTION

1. Technical Field

The present invention relates in general to a system and method for providing and processing or using a card associated to its own services and associated to other cards with their own services, and, in particular, to a system and method for overloading an existing card so that services of the existing card and services for other cards may be selectively or programmatically processed or used by having to only use the existing card. Still particularly, the present invention relates to a server system, such as a remote server or a local server, that is set up and provides the overloading feature for the existing card wherein the existing card has its own service and is overloaded with the services of other cards.

2. Description of the Related Art

A person may typically carry a various number of cards, such as credit cards, driver's license card, membership cards, etc., with him or her. However, the carrying of so many cards may be quite cumbersome and bulky for a person. For example, the large number of cards may cause a person's wallet to bulge. Also, the tasks of managing and tracking so many cards may become quite a hassle or burden.

Various types of universal cards or smart cards have been developed to integrate convenience and usability of multiple cards of a user into a single card. For these types of universal cards or smart cards, a generic universal card or generic smart card is provided, and the card services from all the different cards that a person owns is associated and programmed to the single universal card or smart card. The single generic card is generally used to integrate card services from various cards, and the card itself has no other functions or inherent operations. Some of these universal cards or smart cards require changing, updating, and/or maintaining of stored data on the cards themselves or may require the informing of the card service providers of the various cards regarding the integration of the cards to the universal card or smart card. Furthermore, some of these universal cards or smart cards require a power source to maintain, store, and/or display the data on the card. U.S. Pat. No. 5,530,232 to Taylor; U.S. Pat. No. 4,700,055 to Kashkashian Jr.; U.S. Pat. No. 4,443,027 to McNeely et al.; U.S. Pat. No. 5,546,523 to Gatto; U.S. Pat. No. 4,593,936 to Opel; U.S. Pat. No. 5,276,311 to Hennige; U.S. Pat. No. 5,477,040 to Lalonde provide examples of such universal cards or smart cards.

However, the problem with universal cards or smart cards is that they require the providing of the additional generic cards that are not themselves inherently functional or operational cards. For authentication purposes, a vendor or business establishment may not simply accept the universal card or smart card on its face value and may still require seeing and verifying the existence of the actual, real card itself that has been integrated into the universal card or smart card. This requirement defeats one of the main purposes of having a universal card or smart card since the person would still have to carry the cards that were integrated into the single universal card or smart card in the event of an authentication or verification request.

It would therefore be advantageous and desirable to provide a system and method for overloading an existing card having its own card service with at least one other card service of at least one other card and to avoid having to provide an additional generic card with no further function or operation to be used as the integrated card. It would also be advantageous and desirable to provide an overloaded card having its own card service that is able to act as a default card service and also having card services from other cards that are able to be accessed and used as well. It would further be advantageous and desirable to provide an overloaded existing card that does not require the changing, updating, and/or maintaining of stored data on the card itself or that does not require the informing of the card service providers of the various cards being integrated to the overloaded card. It would still further be advantageous and desirable to provide an overloaded existing card that does not itself have to be modified in any way and that does not require any power source for maintaining, storing, or displaying the data on the card.

SUMMARY OF THE INVENTION

It is therefore one object of the present invention to provide a system and method for overloading an existing card having its own card service with at least one other card service of at least one other card and to avoid having to provide an additional generic card with no further function or operation to be used as the integrated card.

It is another object of the present invention to provide an overloaded card having its own card service that is able to act as a default card service and also having card services from other cards that are able to be accessed and used as well.

It is a further object of the present invention to provide an overloaded existing card that does not require the changing, updating, and/or maintaining of stored data on the card itself or that does not require the informing of the card service providers of the various cards being integrated to the overloaded card.

It is still a further object of the present invention to provide an overloaded existing card that does not itself have to be modified in any way and that does not require any power source for maintaining, storing, or displaying the data on the card.

The foregoing objects are achieved as is now described. A system and method of providing and using an overloaded card with overloaded card services. A card terminal is able to read an existing or overloaded card. A server system is coupled in communications to the card terminal wherein the overloaded card services are set up and provided by the server system. An existing card having an associated card service that is used by a card user is provided. The card terminal reads the existing card, and the server system determines whether the existing card is to be overloaded with at least one other card service of at least one other card. The existing card is provided and used with only the associated card service if the existing card is not to be overloaded with at least one other service of at least one other card. The server system is set up so that the existing card is the overloaded card with the overloaded card services and at least one other service of at least one other card is associated to the existing card if the existing card is to be overloaded with at least one other service of at least one other card. The existing card is provided and used as the overloaded card with the overloaded services which include the associated card service and at least one service if the existing card is to be overloaded with at least one other service of at least one other card.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 is a flow chart of an algorithm for reading an existing card at a card terminal and setting up a server system for being able to use the existing card as an overloaded card; and FIG. 6 is a flow chart of an algorithm for reading an existing card at a card terminal of a local networked vendor and setting up the server system of the local networked vendor for being able to overload and use the existing card with the card service of the local networked vendor when the existing card is used at one of the locations of the local networked vendor.

DETAILED DESCRIPTION OF ILLUSTRATIVE EMBODIMENT

The present invention provides a system and method for overloading an existing card having its own card service with at least one other card service of at least one other card and to avoid having to provide an additional generic card with no further function or operation to be used as the integrated card. The present invention also provides an overloaded card having its own card service that is able to act as a default card service and also having card services from other cards that are able to be accessed and used as well. The present invention further provides an overloaded existing card that does not require the changing, updating, and/or maintaining of stored data on the card itself or that does not require the informing of the card service providers of the various cards being integrated to the overloaded card.

The present invention still further provides an overloaded existing card that does not itself have to be modified in any way and that does not require any power source for maintaining, storing, or displaying the data on the card.

Figure 1:
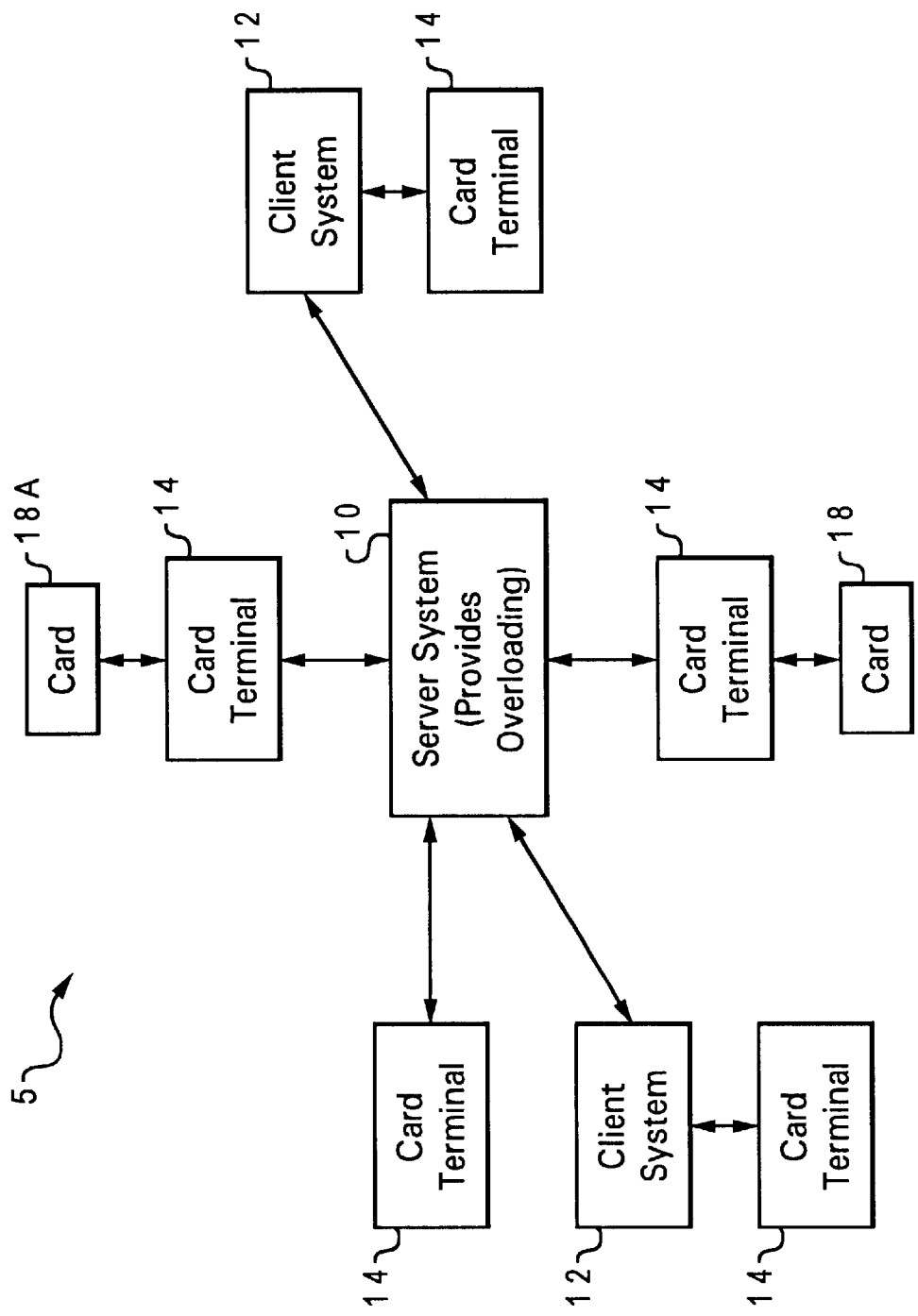
FIG. 1 is a block diagram illustrating a general topology of a server system, client systems, and card terminals that are used for providing the present invention system and method for overloading an existing card.
Figure 3:
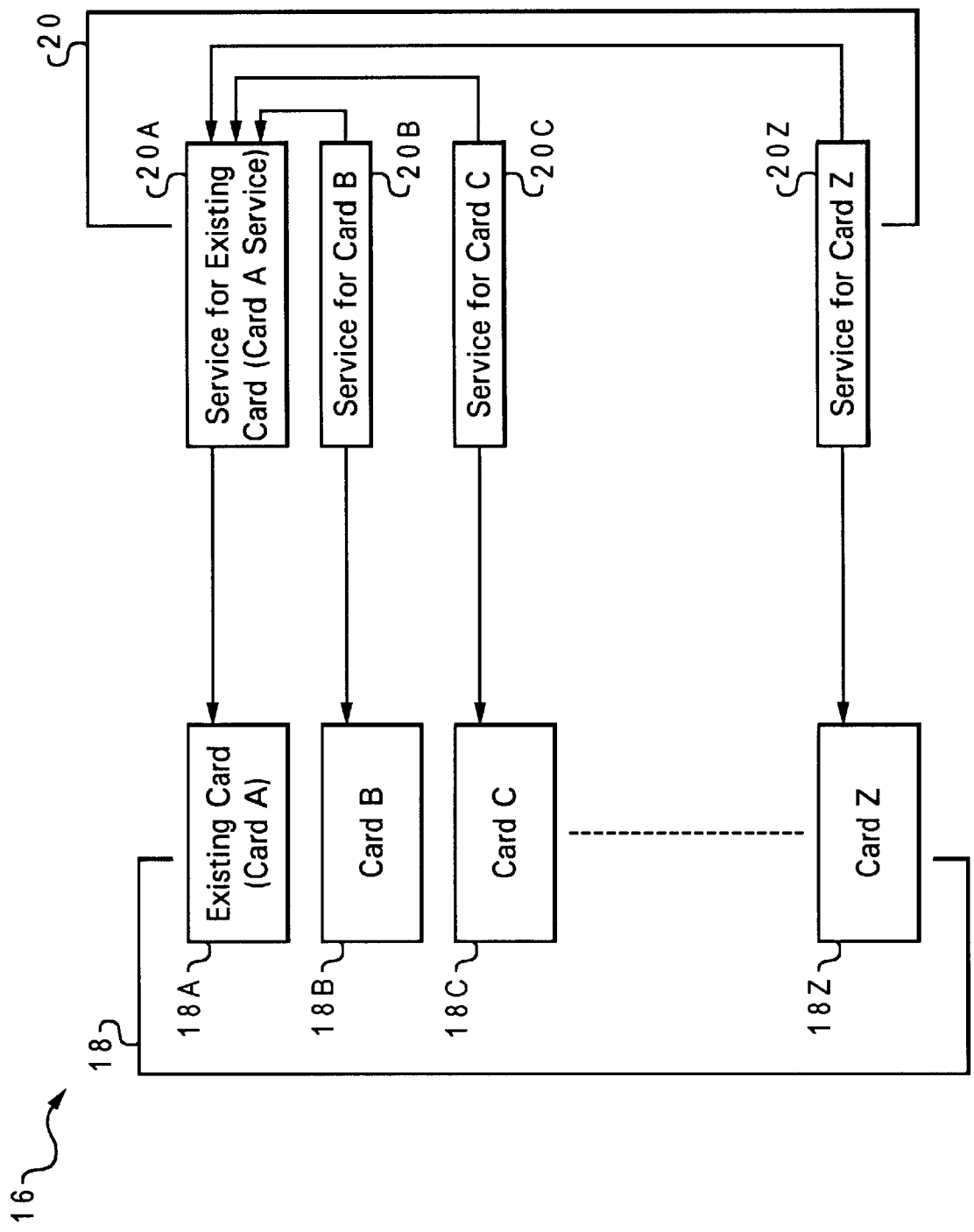
FIG. 3 is a block diagram illustrating the overloading of an existing card that has its own card service with card services of other cards.

With reference now to the figures and in particular with reference to FIG. 1, a block diagram 5 illustrating a general topology of a server system 10, client systems 12, and card terminals 14 that are used for providing the present invention system and method for overloading an existing card is shown. The server system 10 provides the present invention overloading feature for one of the existing cards 18 of (see FIG. 3). The server system 10 is in communications with card terminals 14 either directly or through client systems 12. For example, existing card 18A that is shown in FIG. 3 is read by a card terminal 14. The card terminal 14 communicates with the server system 10 (directly or through a respective client system 12). The server system 10, in turn, is able to set up and provide the present invention overloading card feature for a designated or selected one of the existing cards 18 (see FIG. 3).

Figure 1A:
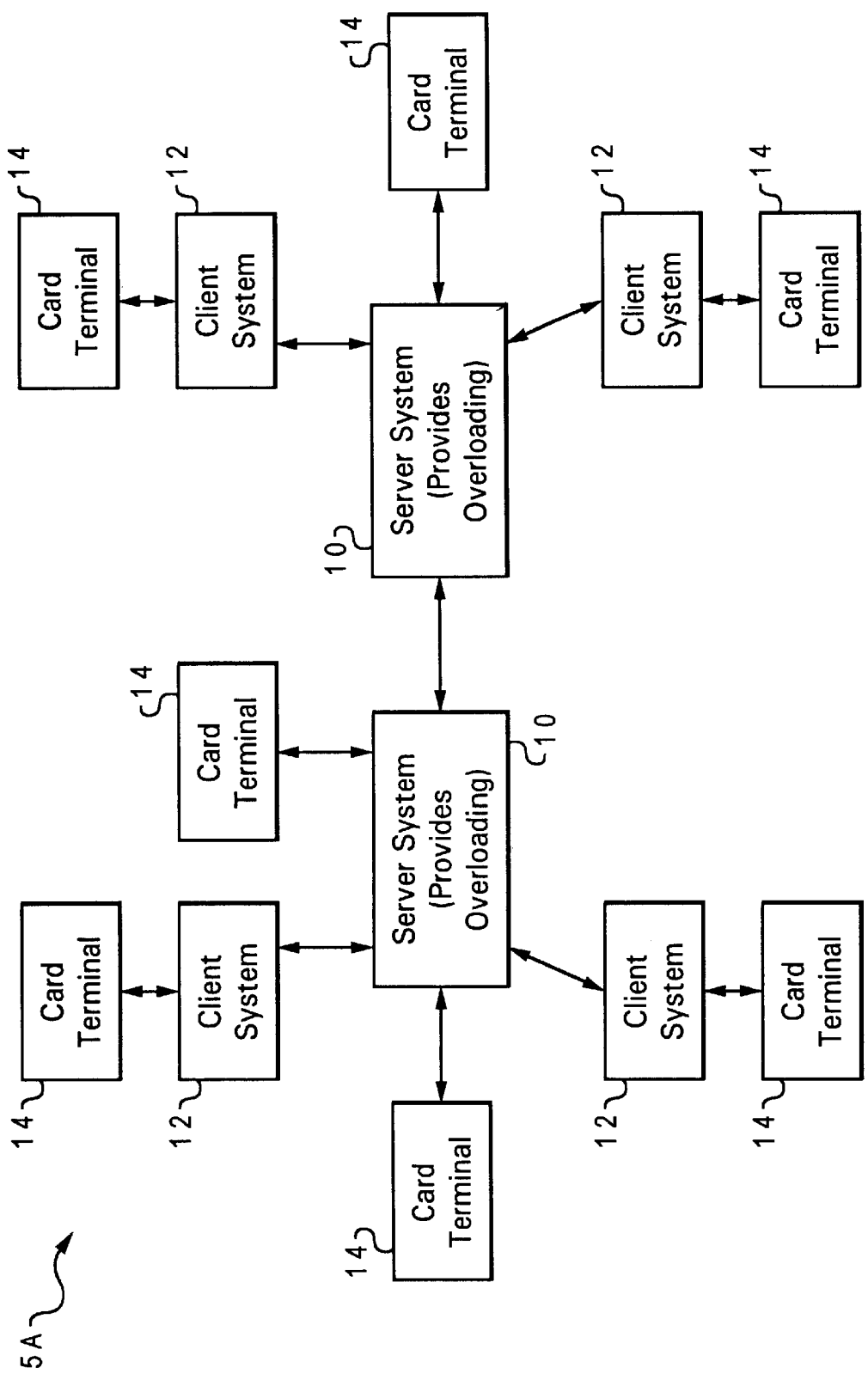
FIG. 1A is a block diagram illustrating another general topology of multiple server systems, client systems, and card terminals that are used for providing the present invention system and method for overloading an existing card.

With reference now to FIG. 1A, a block diagram 5A illustrating another general topology of multiple server systems 10, client systems 12, and card terminals 14 that are used for providing the present invention system and method for overloading an existing card is shown. The server systems 10 provide the present invention over loading feature for an existing card. The server systems 10 are in communication with each other, and the server systems 10 are also in communication with card terminals 14 either directly or through client systems 12. As an example, the existing card of FIG. 3 is read by a card terminal 14. The card terminal 14 communicates with a server system(s) 10 (directly or through a respective client system 12). The server system(s) 10, in turn, is/are able to set up and provide the present invention overloading card feature for a designate d or selected one of the existing card 18.

Figure 2:
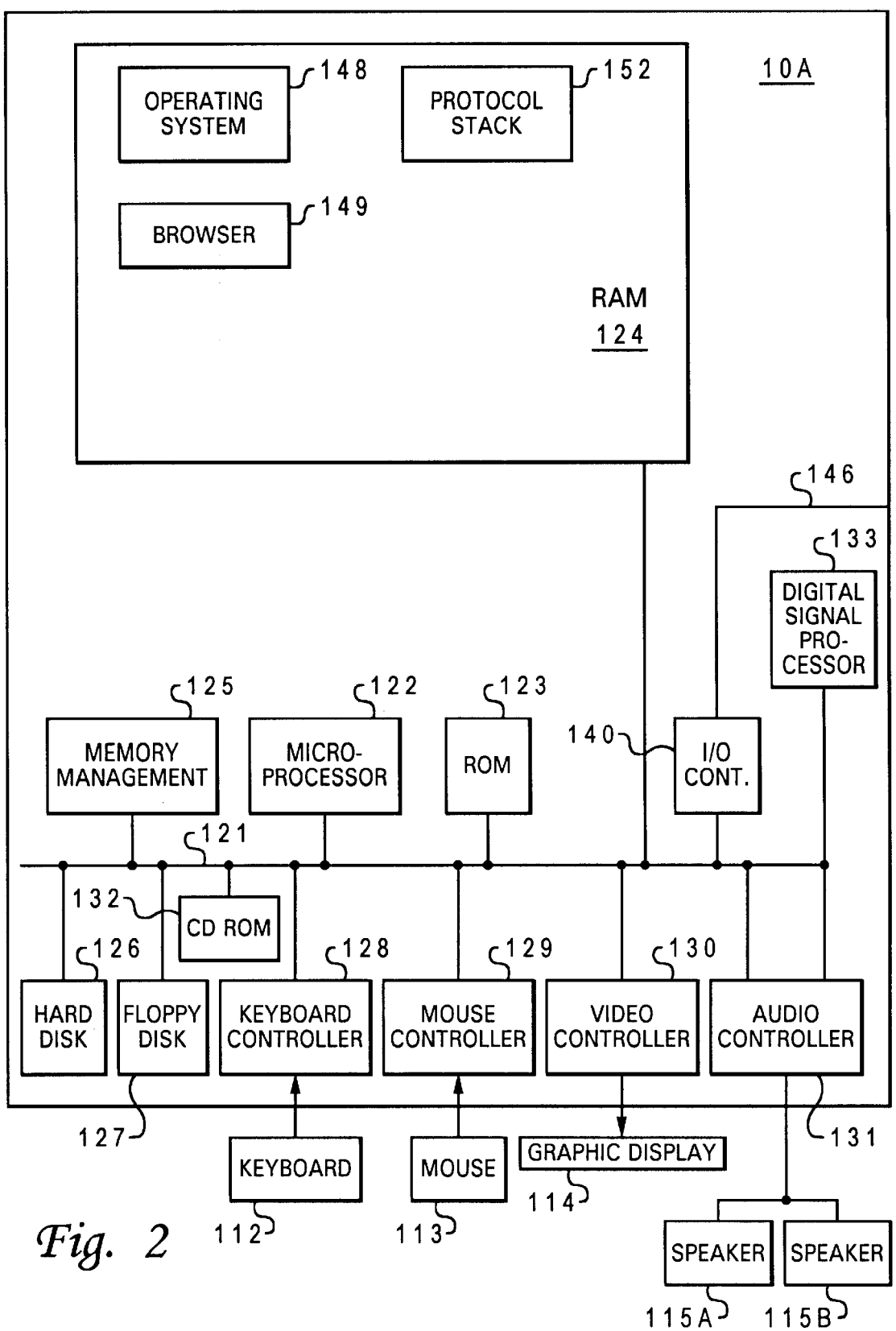
FIG. 2 is an overall example block diagram of a hardware system that may be the server system or the client system used in the present invention system and method for overloading an existing card.

With reference to FIG. 2, a n overall example block diagram of the hardware system 10A, that may be for a server system 10 or a client system 12 as shown in FIG. 1 or 1A, used in the present invention system and method for providing the present invention system and method for overloading an existing card is shown. The hardware system 10A is generally a networked system. The hardware system 10A has a number of sub-systems in communications with or to each other on a communications bus 121. The various sub-systems coupled to the bus 121 include but are not limited to the following systems or devices: a memory management system 125, a microprocessor 122, a read only memory (ROM) system 123, a random access memory (RAM) system 124, an input/output controller (I/O CONT.) 140, a digital signal processor 133, a hard disk 126, a floppy disk 127, a CD ROM 132, a keyboard controller 128, a mouse controller 129, a video controller 130, and an audio controller 131. The I/O CONT. 140 provides communications to an input/output device via line 146. A keyboard 112 is coupled to the keyboard controller 128. A mouse 113 is coupled to the mouse controller 129. A graphic display 114 is coupled to the video controller 130. Speakers 115A and 115B are coupled to the audio controller 131. The RAM system 124 is divided into at least the following memory allocations: 1) operating system 148; 2) protocol stack 152; and 3) a browser or web browser 149. Furthermore, as an example, the card terminal 14 may be any system or device that is able to read data from the existing card 18A of FIG. 3 and that is able to communicate to a server system 10 a shown in FIG. 1.

The present invention is not in any way limited to the specific topologies disclosed herein, and any system and method of providing overloading features to an existing card wherein the existing card has its own card service and is able to be overloaded with card services of other cards may be used for the present invention. The present invention is also not in any way limited to the specific hardware disclosed above for the system 10A, server system 10, client system 12, card terminal 14, and any suitable system, sub-system, and/or device may be used to implement the present invention or in conjunction with the present invention.

With reference to FIG. 3, a block diagram 14 illustrating the overloading of an already existing card 18A (i.e. Card A) that has its own card service 20A with card services 20 (Card B services 20B, Card C services 20C, . . . , Card Z services 20Z) of other cards 18 (i.e. Card B 18B, Card C 18C, . . . , Card Z 18Z). The existing card 18A (i.e. Card A) is set up to be the overloaded card or the card with the overloaded feature. As shown in FIG. 3, the existing card 18A (i.e. Card A) has its own card service 20A (i.e. Card A service 20A). The other cards 18 (i.e. Card B 18B, Card C 18C, . . . , Card Z 18Z) also have their own respective card services 20 (i.e. Card B service 20B, Card C service 20C, . . . , Card Z service 20Z). The overloaded card 18A is provided by associating the card services 20 (i.e. Card B service 20B, Card C service 20C, . . . Card Z service 20Z) of the other cards 18 (i.e. Card B 18B, Card C 18C, . . . , Card Z 18Z) to the existing card 18A so that the existing card 18A is the only card that has to be used and accessed to be able to use its own card service 20A as well as the other card services 20B, 20C, . . . , 20Z. The server system 10 is set up and programmed to provide the overloading feature. Preferences and settings for the card services 20 associated to the existing card 18A (i.e. Card A) may be set up so that a preferred order of use of the card services 20 for the various cards 18 is followed based on various situations and scenarios.

The cards 18 may be a credit card(s), a debit card(s), a membership card(s), a driver's license, an identification card, etc. The present invention is not limited to any specific cards, and any and all cards with associated services 20 may be used in conjunction with the present invention. However, the existing card 18 (i.e. the overloaded card 18A) has to at least have an associated card service 20. Also, one of the fundamental rules for the present invention is that the existing overloaded card 18A (i.e. Card A) generally has to be as valuable, reliable, and sufficiently protected enough as all of the other cards 18 (i.e. Card B, Card C, . . . , Card Z). For example, a major credit card or a driver's license would be good cards to use as the existing overloaded card 18A (i.e. Card A) since they are very widely used and recognized as very secure cards with very reliable services.

As an example, a major credit card that has associated credit card services 20 from a major credit card company is used as the existing overloaded card 18A (i.e. Card A). The server system 10 may be set up and programmed so that the card services 20 from another credit card, a debit card, and a membership card may be overloaded onto the existing card 18A. The existing card 18A is then able to be used as a membership card to enter the membership business establishment by having a card terminal read the existing card 18A at the entrance of the business establishment. The overloaded card services for the existing card 18A are also able to be set up and programmed to automatically charge a certain credit card when the existing card 18A is used at that membership business establishment. If no card 18 has been specified to be charged at that business establishment, then the overloaded card services for the existing card 18 may provide the option to the card holder of charging one of the cards 18 or may be set up and programmed to default or automatically default in charging the major credit card company of the existing card 18A. Furthermore, if one of the pre-designated or pre-programmed cards 18 has been charged to its maximum credit level, then the overloaded card services may be set up on the server system(s) 10 to charge the next card(s) in a preferred or pre-designated charging order.

The card service companies for the other credit card, the debit card, and the membership card all benefit since their services 20 are able to be used on the single existing card 18A. The card service company for the existing card 18A benefits in being designated a default or automatic default card that is charged in instances where pre-designations or pre-settings for charges at some establishments have not been made. Settings and pre-designations may be provided automatically or manual query at the card terminals.

Thus, card service companies have a significant amount of incentives to be the default existing overloaded card. Companies would compete to be the default existing card 18A, and they may offer various promotional or extra services to become the designated default overloaded card. For example, companies may offer debt consolidation services at lower interest rates, better and improved security, cash back and rebates, etc. Furthermore, the default overloaded card establishes greater loyalty by a person or user to that one single card since changing to a new overloaded card would be quite cumbersome and tedious. The change would require the person or user to remove each and every card 18 from the old overloaded card and to add each and every card 18 to the new overloaded card. The server system(s) would have to be reprogrammed and modified to provide the overloaded card services for the new existing card 18 instead of the old existing card 18A. Also, another company's card service, that is not the card company for the existing card 18A but that is associated to the existing card 18A, may be able to offer a certain percentage discount for making the charge to them instead of the card company for the existing card 18A (i.e. default card).

Also, at an establishment that requests a person's address, phone number, expiration date, or social security number, or other such information, this information is able to be automatically provided by the server system(s) 10 to the establishment through programming and setting the overloaded card services for the existing card 18A to provide such information. Thus, such a request(s) by the establishment to the person of such information no longer has to be made since it is able to be provided from the server system(s) 10. The services may be set up to charge the establishment a nominal charge for being provided such information by the server system(s) 10. Additionally, one advantage of the present invention is that the data on the existing card 18A does not have to be changed or altered in any manner. Therefore, the card service company of the existing card 18A also does not have to be contacted, advised, or informed of any changes made when the existing card 18A is overloaded with other card services from other cards 18.

Figure 4:
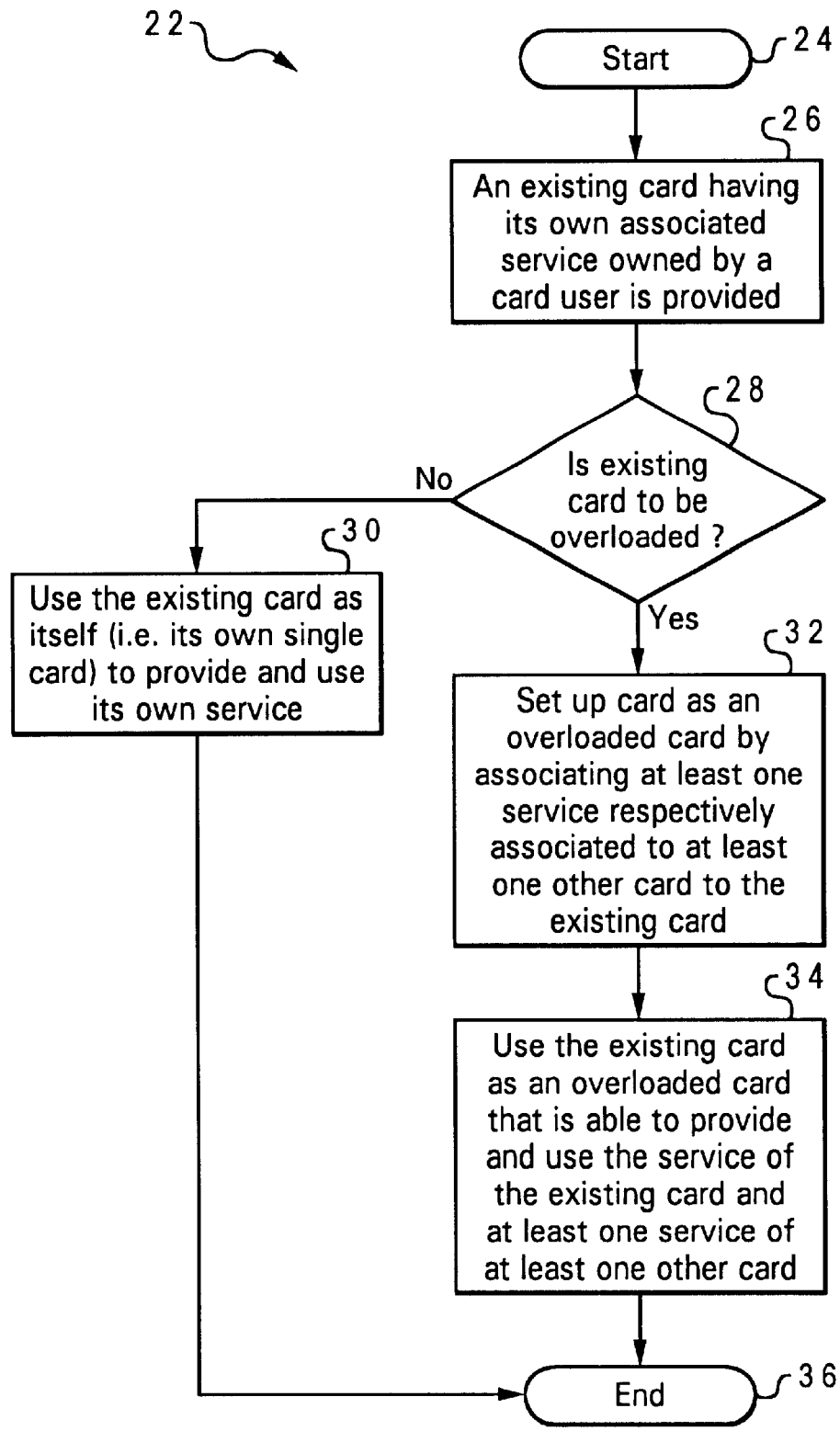
FIG. 4 is a flow chart of a general algorithm for providing and using an existing card that has its own card service and that is able to be overloaded with other card services of other cards.

Referring to FIG. 4, a flow chart of a general algorithm 22 for providing and using an existing card 18A that has its own card service 20A and that is able to be overloaded with other card services 20 of other cards 18 is shown. The algorithm 22 starts at block 24. The algorithm 22 moves to block 26 where an existing card 18A having its own associated service 20 that is owned by a person or card user is provided. The algorithm 22 moves to decision block 28 where it is determined whether the existing card 18A is to be overloaded and provided with overloaded card services. If the existing card 18A is not to be overloaded with at least another card service 20, then the algorithm 22 moves to block 30. At block 30, the existing card 18A is used as itself (i.e. its own single card) to provide and use its own card service 20A only. The algorithm 22 ends at block 36. On the other hand, if the existing card 18A is to be overloaded with at least another card service 20, then the algorithm 22 moves to blocks 32 and 34. At block 32, the existing card 18A is set up as an overloaded card. The existing card 18A is overloaded by associating at least one service 20 that is respectively associated to at least one other card 18 to the existing card 18A so that the card service 20A of the existing card 18A and at least one other service 20 of at least one other card 18 may be accessed and used. At block 34, the existing card 18A is used as an overloaded card that is able to provide and use the service 20A of the existing card 18A and at least one service 20 of at least one other card 18. The algorithm 22 ends at block 36.

With reference to FIG. 5, a flow chart of an algorithm 38 for reading an existing card 18A at a card terminal 14 and setting up a server system 10 for being able to use the existing card 18A as an overloaded card is shown. The algorithm 38 starts at block 40. The algorithm 38 moves to block 42 where the existing card 18A is read by a card terminal 14. The algorithm 38 moves to block 44 where the card terminal 14 communicates with a server system 10 whether directly or through a client system 12. The server system 10 may be a remote server that services a wide number of location or areas or may be a local server for a local number of servers (such as a local server for a local networked vendor). The server system 10 is able to process cards and provide overloaded card services 20 to respective locations or areas (i.e. remote server or local area).

The algorithm 38 moves to block 46 where card service(s) 20 and respective setting(s) are set up for the existing card 18A. The settings may be programmed settings or manual inputs. Some example settings are the set up of charging particular cards when the existing card 18A is used at certain business establishments, the defaulting of a charge to the existing card 18A when a particular card 18 has not been specified for a particular establishment, the charging of various cards 18 based on a preferred order, etc. Furthermore, the card holder's or user's address, telephone number, expiration dates of the cards 18, social security number, personal identification numbers (PIN), other identification and security information, etc. may be programmed in as settings into the database server system(s) 10. The settings are not in any way limited to the ones disclosed in the specification, and any suitable settings may be programmed into the server system(s) 10 and used in conjunction with the present invention.

The algorithm 38 moves to decision block 48. At decision block 48, the algorithm 38 determines whether the existing card 18A is a subscriber to overloaded card services 20. If the existing card 18A is a subscriber to overloaded card services 20, then the algorithm 38 moves to decision block 50. At decision block 50, the algorithm 38 determines whether the card holder or user wishes to modify the services 20 for the existing card 18A. If the card holder or user does wish to modify the services 20, then the algorithm 38 moves from decision block 50 to block 52 wherein the service(s) 20 and/or setting(s) is/are modified accordingly. The existing card 18A is then used as an overloaded card according to the modifications, and the algorithm 38 ends at block 62. On the other hand, if the card holder or user does not wish to modify the services 20, then the algorithm 38 moves from decision block 50 to block 54 wherein the existing card 18A is used according as an overloaded card to the existing settings, that is, the set card service(s) and setting(s). The algorithm 38 ends at block 62.

However, if at decision block 48 the existing card 18A is not a subscriber to overloaded card services, then the algorithm 38 moves to decision block 56. At decision block 56, the algorithm 38 determines whether the card holder or user wishes to subscribe and add overloaded card services 20 to the existing card 18A. This query may be done at a card terminal 14 or a client system 12 communicating with the server system(s) 10. If the card holder or user wishes to subscribe and add overloaded card services 20 to the existing card 18A, then the algorithm 38 moves to block 58. At block 58, at least one other service(s) 20 is added to the existing card 18A, and any respective setting(s) is modified. The existing card 18A is used as an overloaded card. The algorithm 38 ends at block 62. On the other hand, if the card holder or user wishes not to subscribe and add overloaded card services 20 to the existing card 18A, then the algorithm 38 moves to block 60. At block 60, the existing card 18A is used as itself with its own service 20 as a single card. The algorithm 38 ends at block 62. The overloaded card services 20 are generally set up at the server system(s) 10. However, the present invention is not in any way limited to having the overloaded card services 20 for an existing card 18A be set up on a server system 10, and these services 20 may be set up on any suitable system.

Referring to FIG. 6, a flow chart of an algorithm 64 for reading an existing card 18A at a card terminal 14 of a local networked vendor and setting up the server system 10 of the local networked vendor for being able to overload and use the existing card 18A with the card service of the local networked vendor when the existing card 18A is used at one of the locations of the local networked vendor is shown. The local networked vendor may be a chained establishment with various chained locations. The existing card 18A may be set up to automatically charge a card service of the chained establishment when the existing card 18A is used at one of the locations of the chained establishment.

The algorithm 64 starts at block 66. The algorithm 64 moves to block 68. At block 68, the existing card 18A having at least its own card service 20A is read by a card terminal 14 owned or operated by a local networked vendor. The algorithm 64 moves to block 69 wherein the card terminal 14 communicates with a server system 10 owned or operated by the local networked vendor that is able to process the existing card 18A. The algorithm 64 moves to decision block 70. At decision block 70, the algorithm 64 determines whether the card service 20 of the local networked vendor has been set up and added to the existing card 18A.

If the card service 20 of the local networked vendor has been set up and added to the existing card 18A, then the card service 20 of the local networked vendor is set up to be automatically utilized when the existing card 18A is used at one of the locations within the local networked vendor. The algorithm 64 ends at block 82. However, if at decision block 70 the card service of the local networked vendor has not been set up and added to the existing card 18A, then the algorithm 64 moves to decision block 74.

At decision block 74, the algorithm 64 determines whether the card holder or user wishes to set up and associate the card service of the local networked vendor to the existing card 18A. If the card holder or user wishes to set up and associate the card service of the local networked vendor to the existing card 18A, then the algorithm 64 moves to blocks 76 and 78. At block 76, the card service of the local networked vendor is added and associated to the existing card 18A. At block 78, the card service of the local networked vendor is set up to be automatically utilized when the existing card 18A is used at one of the locations within the local networked vendor. The algorithm 64 ends at block 82. On the other hand, if at decision block 74 the card holder or user wishes to not set up and associate the card service 20 of the local networked vendor to the existing card 18A, then the algorithm 64 moves to block 80 where the existing card 18A is used with its already associated services 20 which includes at least its own card service 20A. The algorithm 64 ends at block 62.

On the other hand, if at decision block the card service of the local networked vendor has been set up and added to the existing card 18A, then the algorithm 64 moves to block 72. At block 72, the card service of the local networked network vendor is set up to automatically utilize when the existing card 18A is used at one of the locations with the local networked vendor. The algorithm 64 ends at block 62.

While the invention has been particularly shown and described with reference to a preferred embodiment, it will be understood by those skilled in the art that various changes in form and detail may be made therein without departing from the spirit and scope of the invention.

What is claimed is:

1. A method of providing and using a card with a card service, comprising the steps of:

associating a host card with an associated card service that is used by a card user, determining whether or not to overload the host card with at least one other card service of at least one other card, setting up the host card with the at least one other card service by associating the at least one other card service with the host card if the host card is to be overloaded with the at least one other service of the at least one other card as managed by a networked server independent of altering any data stored on the host card; and managing the host card with the at least one other card service within a networked server independent of altering any data on the host card, wherein said managing includes:

responsive to a specified vendor establishment being designated as associated with one of said at least one other card service, automatically charging said one of said at least one other card service when said host card is used at said specified vendor establishment, and charging another of said at least one card service responsive to no specified vendor being designated.

2. The method according to claim 1, wherein the host card is read by a card terminal and wherein the card terminal is in communications with the at least one server system and wherein the at least one other card service is set up and provided by the at least one server system.

3. The method according to claim 2, wherein the card terminal is in communications with the at least one server system through a client system.

4. The method according to claim 2, further comprising the step of:

programming various settings for the host card and the at least one other card service at the server system.

5. The method according to claim 4, wherein the programming step further comprises the step of:

programming a specified order of charging among the host card services at respective establishments that each has the card terminal if a specified card service to be charged is unable to be charged.

6. The method according to claim 4, wherein the programming step further comprises the steps of:

maintaining card information on the server system, and sending desired data from the card information maintained in the server system to the card terminal of each of the respective establishments that requests the desired data.

7. The method according to claim 6, wherein the desired data further comprises card user address, card user telephone number, card user identification information, card expiration information, and card security information.

8. The method according to claim 4, further comprising the steps of:

determining whether the host card is a subscriber to the at least one other card service, receiving an indication of whether the card user wishes to modify the at least one other card service for the host card if the host card is a subscriber to the at least one other card service, in response to an indication that the card user wishes to modify the at least one other card service for the card, modifying the at least one other card service, in response to determining that the host card is not a subscriber to the at least one other card service, determining whether the card user wishes to subscribe and add the at least one other card service to the host card, and in response to determining that the card user wishes to subscribe and add the at least one other card service, adding the at least one other card service to the host card within the server system.

9. The method according to claim 4, wherein the server system is a remote server that services various card terminals at a wide number of locations.

10. The method according to claim 4, wherein the server system is a local area server that services a number of card terminals within a local network.

11. The method according to claim 10, wherein the server system and the card terminal are operated by a local networked vendor and further comprising the steps of:

determining whether a local card service of the local networked vendor has been associated with the host card within the server system, in response to the local card service of the local networked vendor being associated with the host card within the server system, automatically utilizing the local card service when the host card is used at a location of the local networked vendor that has the card terminal, in response to determining that the local card service has not been associated with the host card within the server system, receiving an indication of whether the card user wishes to set up and associate the local card service with the host card, and in response to receiving an indication that the card user wishes to set up and associate the local card service with the host card, associating the local card service with the host card and automatically utilizing the local card service when the host card is used at a location of the local networked vendor that has the card terminal.

12. A system of providing and using a card with a card service, comprising:

means for associating a host card with an associated card service that is used by a card users, means for determining whether or not to overload the host card with at least one other card service of at least one other card, means for setting up the host card with the at least one other card service by associating the at least one other card service with the host card if the host card is to be overloaded with the at least one other service of the at least one other card as managed by a networked server independent of altering any data stored on the host card; and means for managing the host card with the at least one other card service within a networked server independent of altering any data on the host card, wherein said managing includes:

responsive to a specified vendor establishment being designated as associated with one of said at least one other card service, automatically charging said one of said at least one other card service when said host card is used at said specified vendor establishment, and charging another of said at least one card service responsive to no specified vendor being designated.

13. The system according to claim 12, further comprising:

at least one card terminal for reading said host card; and at least one client system coupled between the at least one card terminal and the at least one server system wherein the at least one client system facilitates communications therebetween.

14. The system according to claim 12, wherein the at least one server system is programmed with various settings for the card and the at least one other card service.

15. The system according to claim 14, wherein the at least one server system is programmed to select among which of the host card services are to be charged when the host card is used at respective establishments that each has the at least one card terminal.

16. The system according to claim 14, wherein the at least one server system is programmed with a specified order of charging among the host card services at respective establishments that each has the card terminal if a specified card service to be charged is unable to be charged.

17. The system according to claim 14, wherein the at least one server system maintains card information and provides desired data from the card information to the card terminal of each of the respective establishments that requests the desired data.

18. The system according to claim 17, wherein the desired data further comprises card user address, card user telephone number, card user identification information, card expiration information, and card security information.

19. The system according to claim 14, wherein the at least one server system:

determines whether the host card is a subscriber to the at least one other card service, receives an indication of whether the card user wishes to modify the at least one other card service for the host card if the host card is a subscriber to the at least one other card service, in response to an indication that the card user wishes to modify the at least one other card service for the host card, modifies the at least one other card service, in response to determining that the host card is not a subscriber to the at least one other card service, determines whether the card user wishes to subscribe and add the at least one other card service to the host card, and in response to determining that the card user wishes to add the at least one other card service, adds the at least one other card service to the host card within the server system.

20. The system according to claim 14, wherein the at least one server system is at least one remote server that each provides services to various card terminals at a wide number of locations.

21. The system according to claim 14, wherein the at least one server system is at least one local area server that each provides services to a number of card terminals within a local network.

22. The system according to claim 21, wherein the at least one server system and the at least one card terminal are operated by a local networked vendor and wherein the at least one server system:

determines whether a local card service of the local networked vendor has been associated with the host card within the server system, in response to the local card service of the local networked vendor being associated with the host card within the server system, allows the local card service to be automatically utilized when the host card is used at a location of the local networked vendor that has the card terminal, in response to determining that the local card service has not been associated with the host card within the server system, receives an indication of whether the card user wishes to set up and associate the local card service with the host card, and in response to receiving an indication that the card user wishes to set up and associate the local card service with the host card, associates the local card service with the host card and allows the local card service to be automatically utilized when the host card is used at a location of the local networked vendor that has the at least one card terminal.

23. A program product for providing and using an existing card with a card service, comprising:

instruction means for associating a host card with an associated card service that is used by a card user, instruction means for determining whether the host card is to be overloaded with at least one other card service of at least one other card, instruction means for setting up the host card with the at least one other card service by associating the at least one other service of the at least one other card with the host card if the host card is to be overloaded with the at least one other service of the at least one other card as managed by a networked server independent of altering any data stored on the host card, and instruction means for managing the host card with the at least one other card service within a networked server independent of altering any data on the host card, wherein said managing includes:

responsive to a specified vendor establishment being designated as associated with one of said at least one other card service, automatically charging said one of said at least one other card service when said host card is used at said specified vendor establishment, and charging another of said at least one card service responsive to no specified vendor being designated, and computer usable media bearing said instruction means.

24. The program product according to claim 23, wherein said computer usable media is a memory media.

25. The program product according to claim 23, wherein said computer usable media bearing is a floppy disk.

* * * * *